United States Patent
Yoshitomi et al.

[11] Patent Number: 6,157,151
[45] Date of Patent: Dec. 5, 2000

[54] MOTOR DRIVE CIRCUIT

[75] Inventors: Tetsuya Yoshitomi, Gunma-ken; Takashi Someya, Hanyu, both of Japan

[73] Assignee: Sanyo Electric Co., Ltd., Osaka, Japan

[21] Appl. No.: 09/363,621

[22] Filed: Jul. 29, 1999

[30] Foreign Application Priority Data

| Jul. 31, 1998 | [JP] | Japan | 10-218199 |
| Jul. 31, 1998 | [JP] | Japan | 10-218200 |
| Jul. 31, 1998 | [JP] | Japan | 10-218201 |

[51] Int. Cl.$^7$ .................................................. H02P 7/06
[52] U.S. Cl. .......................... 318/254; 318/138; 318/245; 318/439
[58] Field of Search ..................... 318/138, 139, 318/245, 254, 439, 603, 254 A, 434; 388/805, 812, 817, 820, 904, 911, 912

[56] References Cited

U.S. PATENT DOCUMENTS

| 4,633,150 | 12/1986 | Inaji et al. | 318/254 |
| 5,124,625 | 6/1992 | Wakabayashi | 318/603 |
| 5,140,232 | 8/1992 | Naito | 318/138 |
| 5,166,583 | 11/1992 | Min et al. | 318/138 |
| 5,196,771 | 3/1993 | Naito | 318/254 |
| 5,319,290 | 6/1994 | Yoshino et al. | 318/254 |
| 5,399,953 | 3/1995 | Yoshino | 318/799 |
| 5,644,203 | 7/1997 | Naito et al. | 318/439 |
| 5,696,871 | 12/1997 | Yama et al. | 388/814 |
| 5,731,671 | 3/1998 | Adam et al. | 318/254 |
| 5,920,176 | 7/1999 | Blackburn et al. | 318/701 |
| 5,952,798 | 9/1999 | Jones et al. | 318/268 |
| 5,977,737 | 11/1999 | Labriola | 318/599 |
| 6,008,603 | 12/1999 | Jones et al. | 318/254 |
| 6,040,668 | 3/2000 | Huynh et al. | 318/471 |

Primary Examiner—Paul Ip
Attorney, Agent, or Firm—Hogan & Hartson LLP

[57] ABSTRACT

A full wave signal E is compared with a trapezoidal wave signal G in a comparator to output a second comparison signal H. The full wave signal E is obtained through full wave conversion applied to a sine wave signal of a Hall element. The trapezoidal wave signal G is obtained by sampling and holding an attenuated signal F, obtained by attenuating the full wave signal E, at a trailing end of a first comparison signal D, and nulling the attenuated signal F at a subsequent leading end thereof. Then, the first and second comparison signals D, H are added up in an OR circuit to output an addition signal K, so that no drive current IL flows through the driving coils at a point near the former and latter halves of a phase changeover point. Near the former half of a phase changeover a point, the drive current IL is nulled before counter electromotive force Ec becomes small, enabling motor noise reduction. Near the latter half of a phase changeover point, the drive current IL remains zero, continuously from the former half, preventing a drop of efficiency in driving a motor. Since a trapezoidal wave signal G is made from the attenuated signal F, a period with the drive current IL being zero is always ensured near the former half of a phase changeover point.

11 Claims, 10 Drawing Sheets

MOTOR DRIVE CIRCUIT

BACKGROUND OF THE INVENTION

1. Field of the Invention

The present invention relates to a motor drive circuit that can reduce fan noise.

2. Description of the Related Art

FIG. 1 is a block circuit diagram illustrating a conventional motor drive circuit.

Referring to FIG. 1, drive coils 1 and 2 are structurally attached in a fixed manner to the stator side of a motor. One end of each coil is grounded via a power source Vcc. A drive current IL1 and a drive current IL2 complementarily flow at every electrical angle of 180°. A Hall element 3 is structurally attached at a predetermined position on the stator side of the motor and is connected between the power source Vcc and the ground to receive the power supply. The Hall element 3 produces a sine wave signal H+ and a sine wave signal H− of opposite phases, according to the relative position between the stator and the rotor. An amplifier 4 compares the sine wave signal H+ with the sine wave signal H− and then produces a rectangular wave signal. A control circuit 5 creates a rectangular wave signal B in an opposite phase based on the sine wave signal A output from the amplifier 4 and then current amplifies and outputs the rectangular wave signals A and B. The Darlington-connected NPN transistors 6 and 7 are connected between the other end of the drive coil 1 and the ground. When a high level rectangular wave signal A is applied to the base of an NPN transistor 6, NPN transistors 6 and 7 are turned on, thus causing a drive current IL1 to flow through the drive coil 1. Similarly, the Darlington-connected NPN transistors 6 and 7 are connected between the other end of the drive coil 2 and the ground. When the rectangular wave signal B of a high level is applied to the base of an NPN transistor 8, NPN transistors 8 and 9 are turned on and a drive current IL2 flows through the drive coil 2. Alternately, flowing the drive current IL1 through the coil 1 and the drive current IL2 through the coil 2 drives the motor.

FIG. 2 shows the waveforms of the drive current IL1 and the drive current IL2. The drive current IL1 (=IL) and the drive current IL2 (=IL) are expressed by the following formula;

$$IL=(VCC-Vsat-EC)/RL$$

where VCC is a power source voltage; Vsat is a saturation voltage of the drive transistor 7 or 9; EC is a counter electromotive force; and RL is a component resistance of the drive coil 1 or 2.

Since the counter electromotive force Ec becomes small at the phase changeover point T where the drive current IL1 or the drive current IL2 is switched during the motor running, the drive current IL2 becomes large. However, in actual conditions, the drive current IL at the phase changeover point IL does not efficiently produce the rotational torque because the abrupt change in magnitude of the drive current IL varies the rotational torque of the motor, thus inducing vibration noises of the motor.

Also, there is a problem that, when drive currents IL1, IL2 flow through the drive coils 1, 2 simultaneously with the phase changeover, efficiency in driving the motor may be deteriorated due to the influence of a reactive current.

SUMMARY OF THE INVENTION

The present invention aims to reduce noise caused by a variable speed motor.

According to the present invention, first and second drive transistors are both turned off when switching over first and second coil drive currents. This arrangement can prevent an abrupt change of the coil current and as a consequence reduce motor noise.

In particular, at a period just before the switching over of driving the first and second coils, then the coil current becomes zero before being subjected to the influence caused by a reduction in counter electromotive force. Therefore, inconvenience such that a coil current falling sharply from a high level can be prevented, and motor noise can be reduced.

Further, when an amplitude of a sine wave signal varies due to variation in characteristics of Hall elements, or the like, or when the period of a sine wave signal is changed due to variation in rotational speed of the motor, the period where the first and second drive transistors both remain off near the changeover point of a drive current becomes constant. With this arrangement, an abrupt rise of coil current can be prevented, and a variable speed motor with reduced noise can be achieved. In addition, since coil current remains zero after the changeover point, generation of a reactive current and, as a consequence, reduction of efficiency in driving a motor can be prevented.

Still further, even when an ambient temperature increases, overlapping of the end and starting points of the respective coil currents which flow through the first and second coils can be prevented. As a result, reduction of efficiency in driving a motor can be prevented. Also, there can be provided a motor drive circuit comprising a single chip integrated circuit, which defines lowest value of the reference voltage, the reference voltage varying in response to the variation of the ambient temperature, and can always rotate the fan at a speed according to the ambient temperature.

With an arrangement in which a motor drive current falls gradually (slantingly), motor noise can be further reduced.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Embodiments of a motor drive circuit according to the present invention will be described below with reference to the attached drawings.

Figure 1:
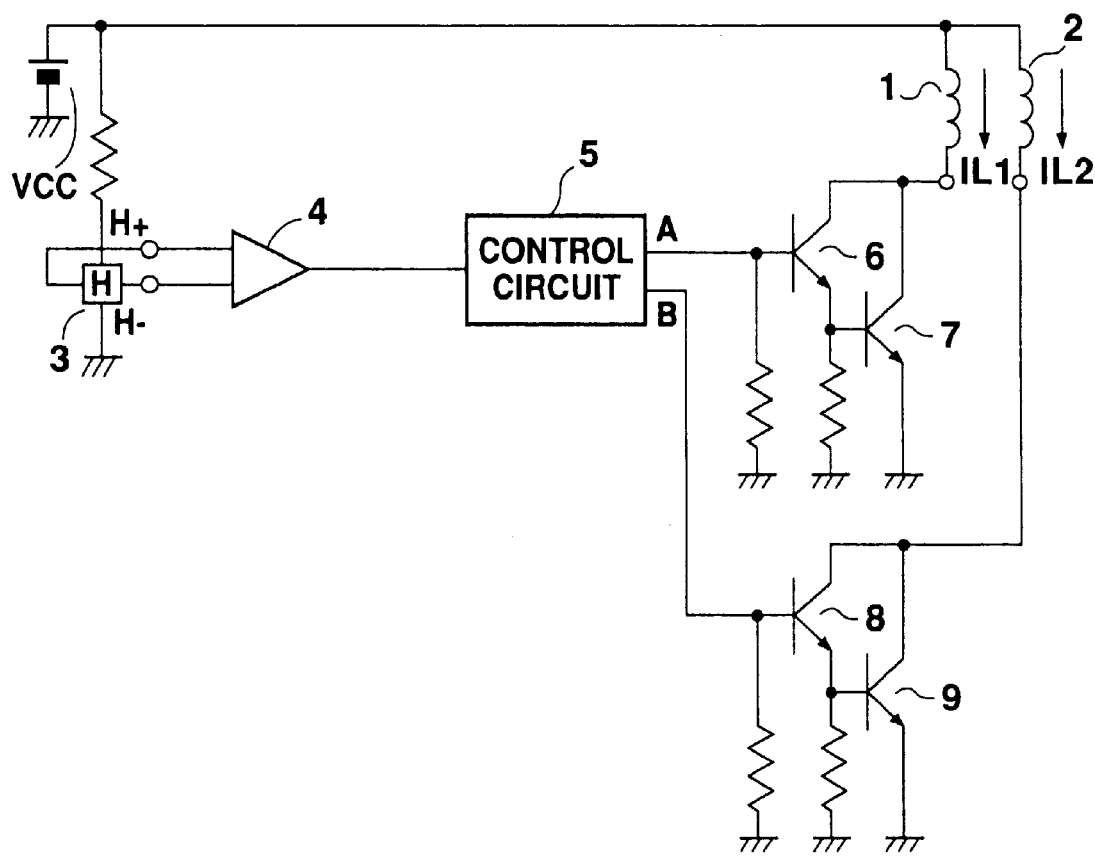
FIG. 1 is a circuit diagram illustrating the configuration of a previous motor drive circuit.
Figure 2:
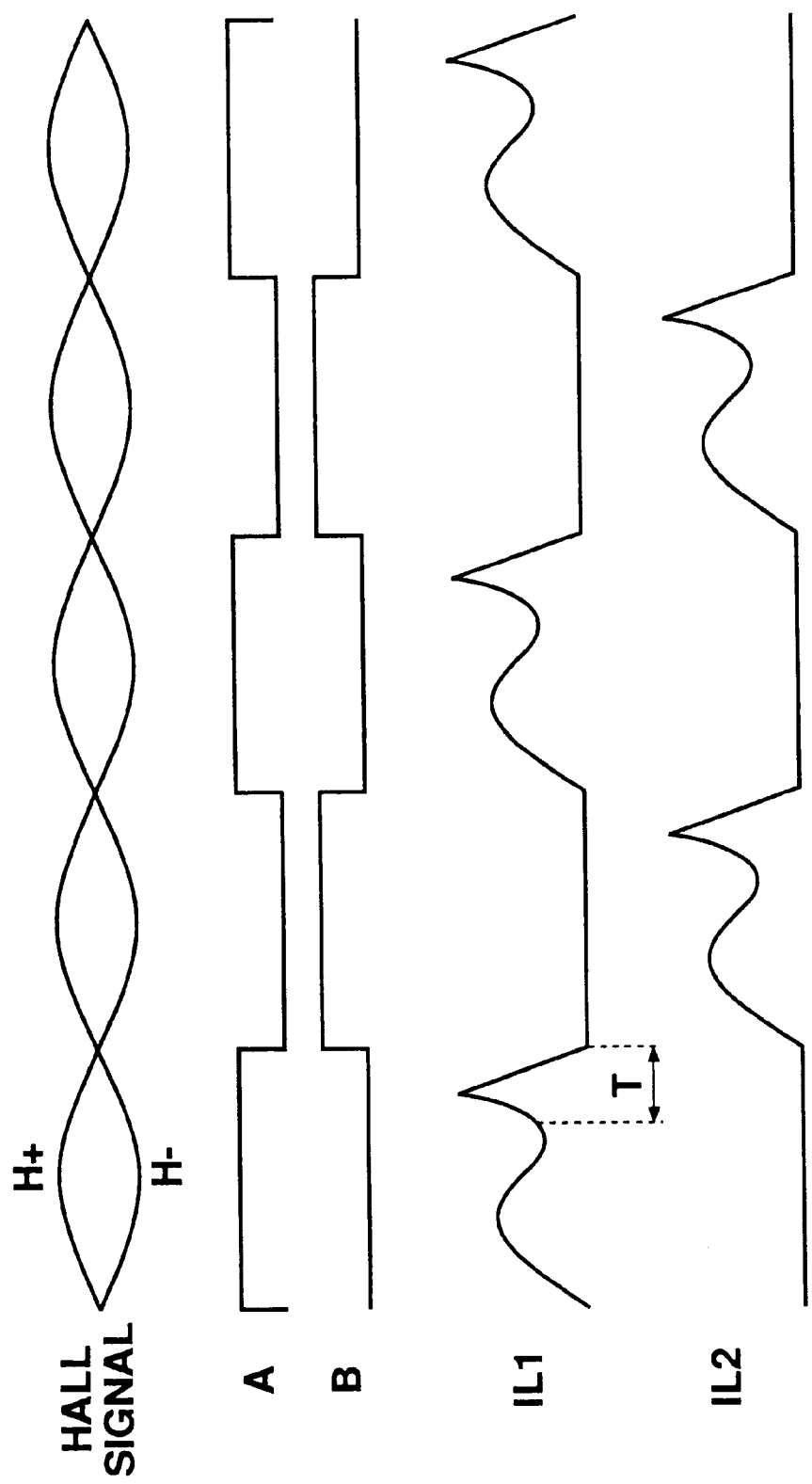
FIG. 2 is a diagram schematically illustrating current waveforms at various points of the motor drive circuit of FIG. 1.
Figure 3:
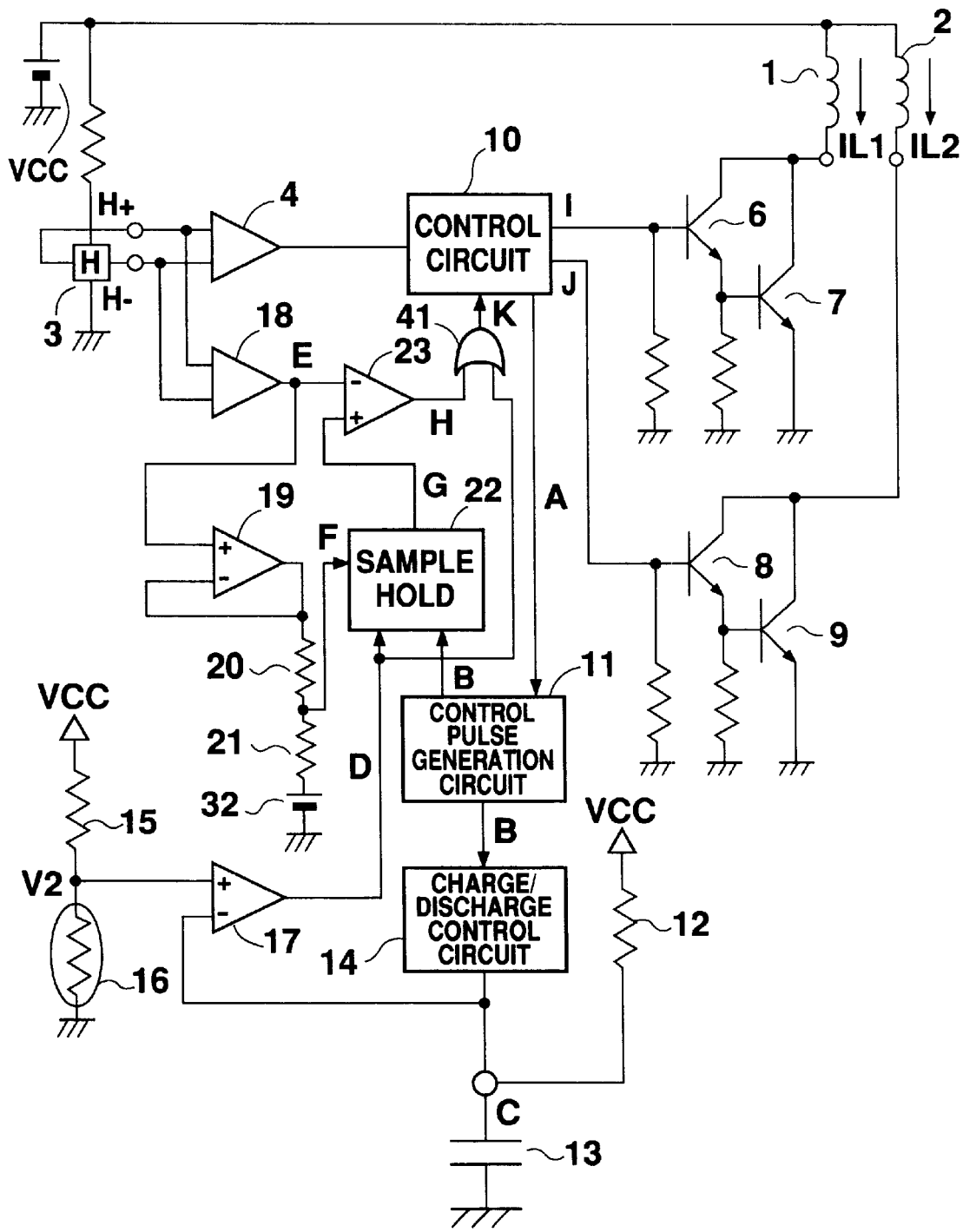
FIG. 3 is a diagram illustrating the configuration of a motor drive circuit according to an embodiment of the present invention.

FIG. 3 is a circuit block diagram illustrating a motor drive circuit according to the present embodiment. In FIG. 3, elements corresponding to described above in FIG. 1 will be given the same reference numerals and their explanation will not be repeated.

Figure 4:
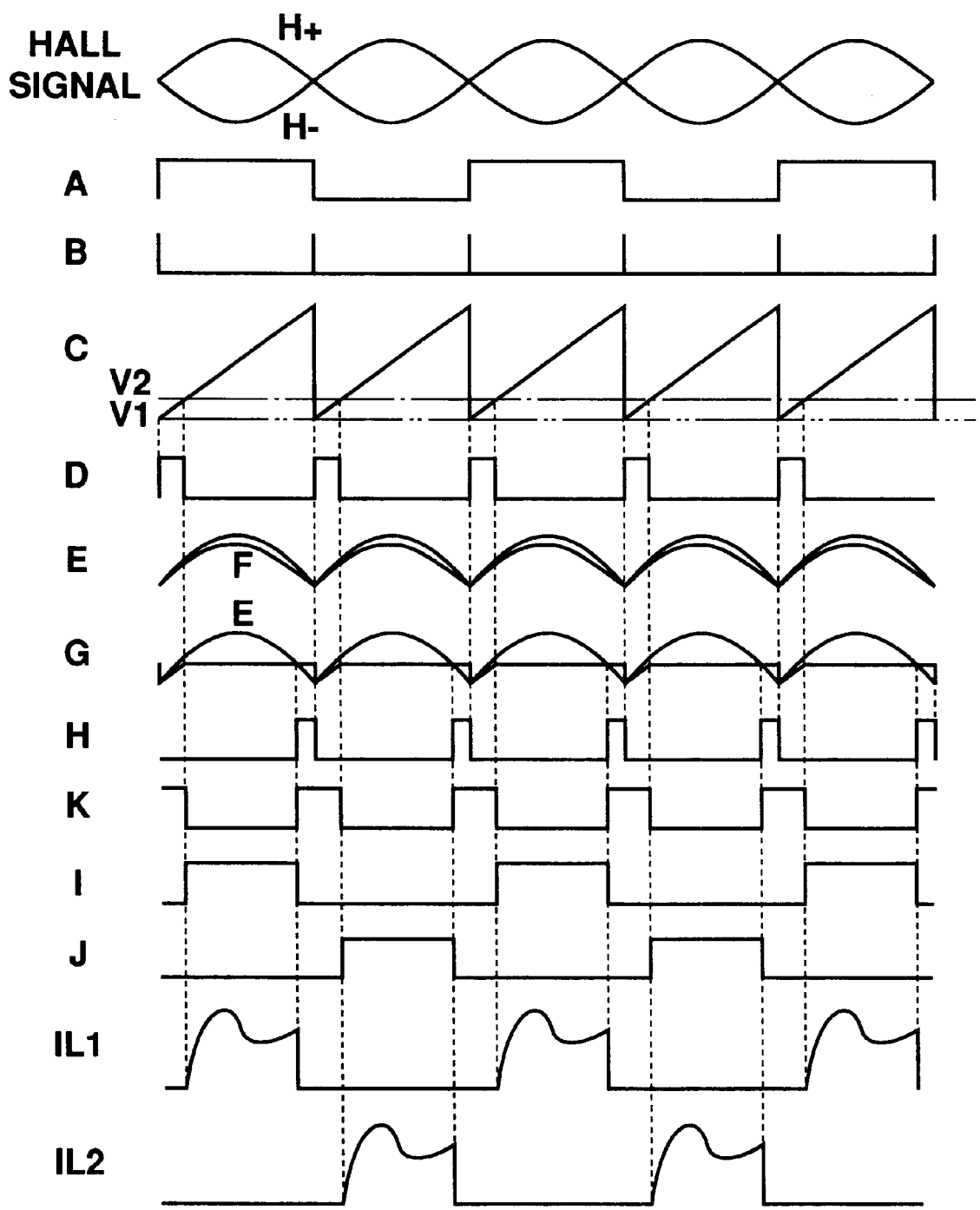
FIG. 4 is a diagram illustrating current waveforms at various points of the motor drive circuit of FIG. 3.

FIG. 4 depicts waveforms showing the operation of the motor drive circuit in FIG. 3.

Referring to FIG. 3, a control circuit 10 converts the sine wave signal from the amplifier 4 into a rectangular wave signal A. A control pulse generation circuit 11 receives the rectangular wave signal A and then generates control pulses B at the leading edge and the trailing edge of the rectangular wave signal A. A resistor 12 and capacitor 13 form a time constant circuit to perform a charging operation according to the resistance value of the resistor 12 and the capacitance value of the capacitor 13. A charging and discharging circuit 14, which is connected to the control pulse circuit 11, discharges the storage charge of the capacitor 13 when it receives the control pulse B. In the discharge operation, the minimum value of the storage charge of the capacitor 13 is limited to the voltage V1, but does not drop less than the voltage V1. The connection point between the resistor 12 and the capacitor 13 produces a sawtooth wave signal C in which the voltage is discharged to the minimum voltage v1 every phase changeover operation. The resistor 15 and the thermistor 16 are serially connected between the power supply VCC and ground. A voltage V2 higher than the voltage V1 occurs from the intermediate connection point between the resistor 15 and the thermistor 16. The first comparator 17 compares the sawtooth wave signal C with the voltage V2. In other words, the first comparator 17 produces a first comparison signal D (a first drive off signal) which is at a high level during the period where the voltage V2 is higher than the sawtooth wave signal C and is at a low level during the period where the voltage V2 is lower than the sawtooth wave signal C. The period where the first comparison signal D is at a high level is shorter with a higher ambient temperature of the thermistor 16, and longer with a lower ambient temperature.

The absolute value circuit 18 outputs an absolute value signal E corresponding to the absolute value of each of the sine wave signals H+ and H− from the Hall element 3. The amplifier 19 attenuates the absolute value signal E with the attenuation factor determined by a resistance value of the resistors 20 and 21, and then outputs the attenuated signal F. The absolute value signal E and the attenuated signal F are given common dc bias by the reference power supply 32. The attenuated signal F is input to the sample and hold circuit (to be described later) 22. The sample and hold circuit 22 samples and holds the attenuated signal F at the trailing edge of the comparison signal D and then drops the attenuated signal F to the minimum voltage of the absolute value signal E at the leading edge of the comparison signal D, thus outputting the trapezoidal wave signal G. The second comparator 23 compares the absolute value signal E with the trapezoidal wave signal G, and then outputs a second comparison signal H (a second drive off signal), which is at a high level during the period where the trapezoidal wave signal G is higher than the absolute value signal E and at a low level during the period where the trapezoidal wave signal G is lower than the absolute value signal E. The second comparison signal H is output during a predetermined period prior to phase changeover of the drive coils 1, 2. The OR circuit 41 adds the first comparison signal D and the second comparison signal H, and outputs an addition signal K for simultaneously turning off the first and second drive transistors 7, 9 the former and latter halves of a period near the changeover point for the drive coils 1, 2. Note that when the first and second comparison signals D, H are added, there is no chance for chattering to occur at the connection point between the leading edge of the first comparison signal D and the trailing edge of the second comparison signal H because the leading edge of the first comparison signal D and the trailing end of the second comparison signal H are based on the control pulse B. Based on a supplied addition signal K, the control circuit 10 outputs a first drive signal I for turning on the first drive transistor 7 and the second drive signal J for turning on the second drive transistor 9. Thus, the drive currents IL1, IL2 flow through the drive coils 1 and 2, so that the motor runs.

As described above, the following advantages can be provided.

(a) Since the drive current IL1, IL2 can be made zero at a period near the phase changeover point before being affected by the influence causing reduced counter electromotive force, inconvenience such that the drive current IL1, IL2 sharply falls from a high level can be prevented, and motor noise can be thus reduced.

(b) When the amplitude of a sine wave signal H+, H− varies due to the variation in characteristics of a Hall element 3, or when the period of a sine wave signal H+, H− is changed due to variation in rotational speed of the motor, the period where the first and second drive transistors are both turned off becomes constant near the changeover point of a drive current so that an abrupt rise in a coil current can be prevented, and a variable speed motor with reduced noise can thus be achieved.

(c) Since the drive currents IL1, IL2 can be made zero the latter half of the period near the changeover point, continuously from near the former half of the changeover point, a reactive current can be neglected, and reduction of efficiency in driving the motor can be prevented.

(d) Since a trapezoidal wave signal G is formed from an attenuated signal F, the second comparison signal H is always generated even though the width of the first comparison signal D is affected by a change of a resistance value of a thermistor 16 due to a change in the ambient temperature. Thus, variation of a rotation torque of the motor and accompanying noise generation can be prevented.

The signal output operation of the motor drive circuit according to an embodiment will be described regarding the sawtooth wave signal C and the trapezoidal signal G of FIG. 4.

Figure 5:
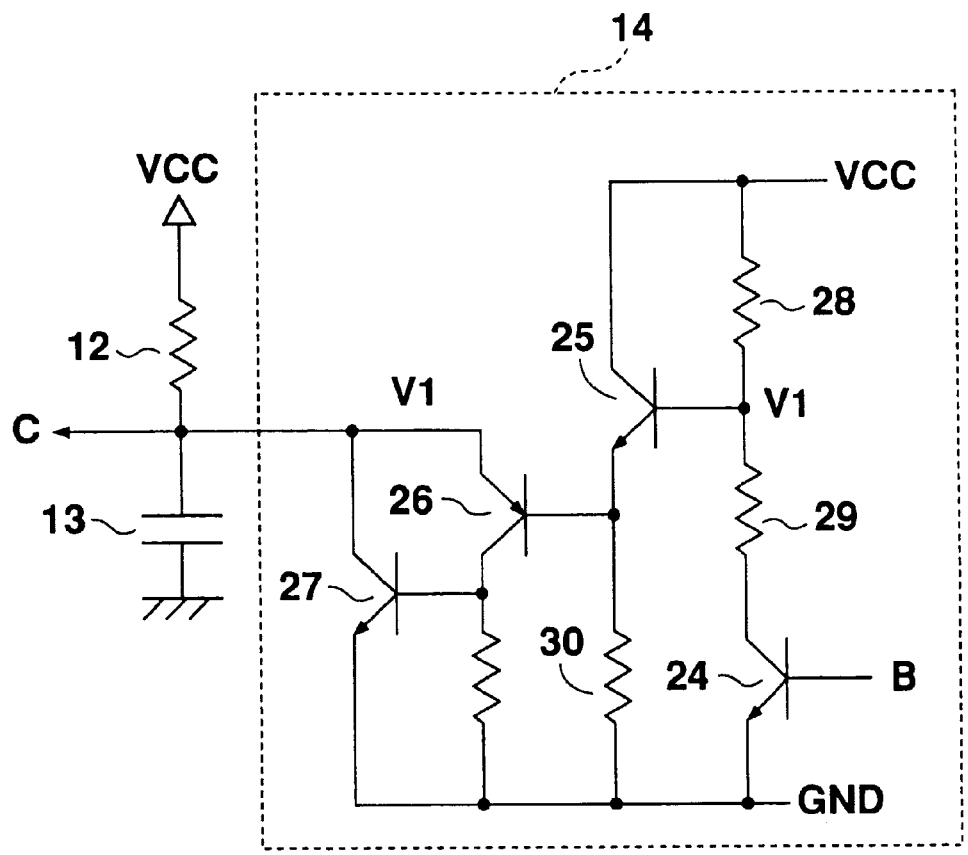
FIG. 5 is a diagram illustrating a sawtooth wave signal generation circuit according to an embodiment of the present invention.

FIG. 5 is a circuit diagram illustrating the charging and discharging control circuit 14 according to an embodiment of the present invention. Referring to FIG. 5, although the base voltage and the emitter voltage are at the same potential, the base voltage of the transistor 25 and the emitter voltage of the transistor 26 vary when the transistor 24 is turned on or off.

Referring to FIG. 5, when the control pulse B is not generated, the transistor 24 is turned off. The base voltage of the transistor 25 and the emitter voltage of the transistor 26 become the voltage Vmax obtained by subtracting the drop voltage across the resistor 28 from the power supply voltage vCC. The capacitor 13 is charged with the time constant determined by the resistance value of the resistor 12 and the capacitance value of the capacitor 13 so that the terminal voltage of the capacitor 13 rises. The generation period of the control pulse B depends on the revolution number of the motor. The time constant is set to the value that the charging voltage of the capacitor 13 does not reach the voltage vmax during the generation period of the control pulse. When the control pulse B is being generated, the transistor 23 is turned on so that the base voltage of the transistor 25 and the emitter voltage of the transistor 26 become a divided voltage V1 (<Vmax) of the resistors 28 and 29. At this time, since the voltage of the non-grounded terminal of the capacitor 13 is higher than the voltage V1, the storage charge of the capacitor 13 is discharged to the voltage V1 via the transistor 27. This operation is repeated to generate the sawtooth wave signal C.

Figure 6:
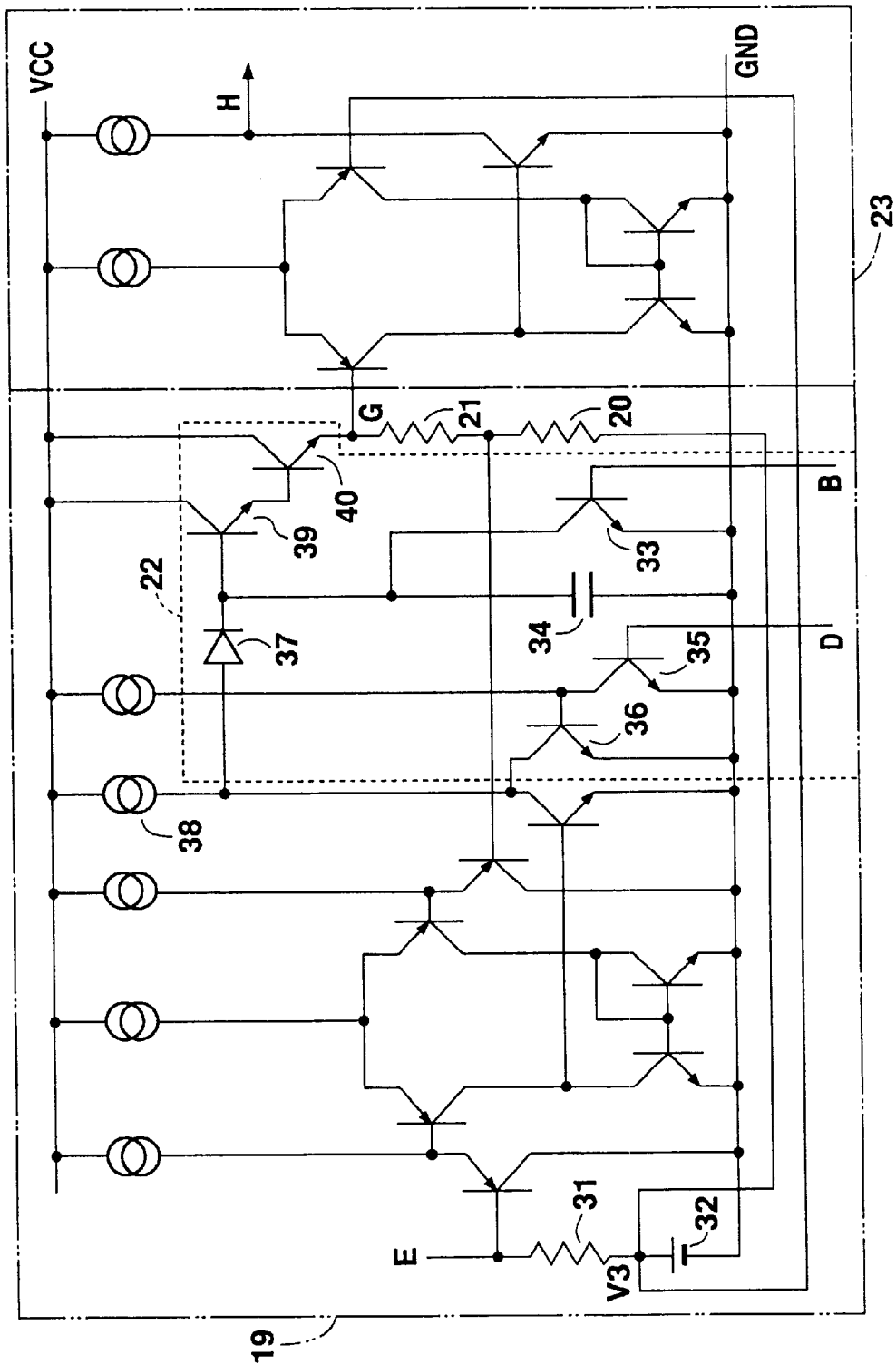
FIG. 6 is a diagram illustrating a trapezoidal signal generation circuit according to an embodiment of the present invention.

FIG. 6 is a circuit diagram illustrating the amplifier 19, the sample and hold circuit 22, and the comparator 23 according to another embodiment of the present invention.

Referring to FIG. 6, the amplifier 19 includes a serial circuit of a resistor 31 connected at the input portion for the absolute value signal E and a reference voltage 32. The resistor 31 converts the absolute value signal E represented as current into a voltage with respect to the reference voltage 32. The combination of the internal differential amplifier circuit and the current mirror circuit amplifies the voltage-converted absolute value signal E, with the amplification factor ((Ra+Rb)/Ra) determined by the resistance values Ra and Rb, and then outputs an amplified signal F. The sample and hold circuit 22 is connected between the output of the amplifier 19 and the output of the comparator 23. In the sample and hold circuit 22, when the control pulse occurs, the NPN transistor 33 is turned on so that the storage charge of the capacitor is discharged. In this operation, since the first comparison signal D remains a high level until the sawtooth wave signal C exceeds the voltage 2 from an occurrence of the control pulse B, the transistor 35 is turned on and the transistor 36 is turned off. At a result, the capacitor 13 is charged via the diode 37. Thereafter, when the first comparison signal D changes to a low level, the transistor 35 is turned off while the transistor 36 is turned on. Since the whole current of the current source 28 flows through the collector to emitter path of the transistor 34, the capacitor 34 stops charging so that the terminal voltage of the capacitor 34 is held. The Darlington-connected transistors 39 and 40 operate to suppress the discharge amount of the storage charge to a minimum value when the capacitor 34 is in a voltage holding state. This results in an occurrence the trapezoidal signal G.

Figure 7:
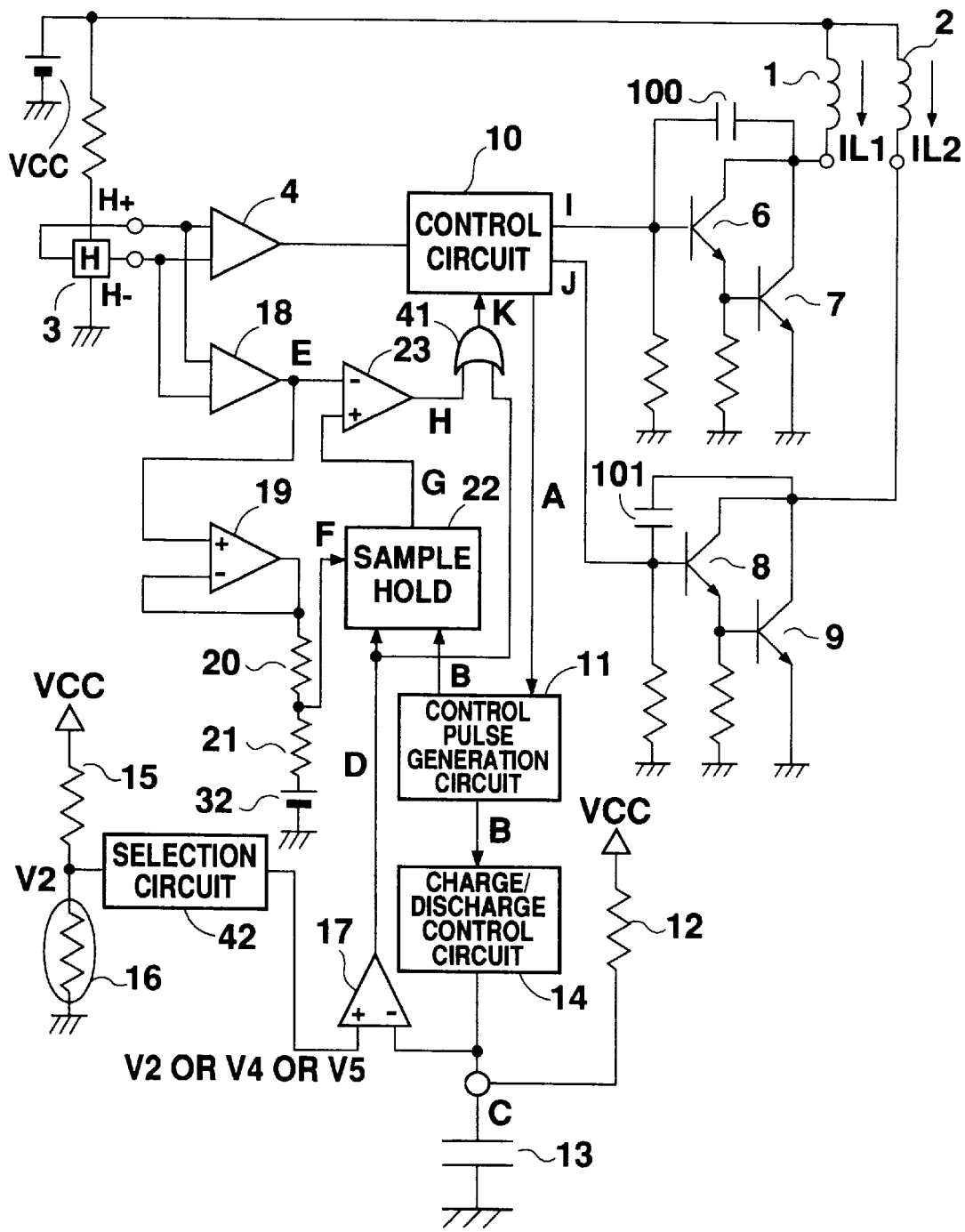
FIG. 7 is a diagram illustrating the configuration of a motor drive circuit according to a modified embodiment.
Figure 8:
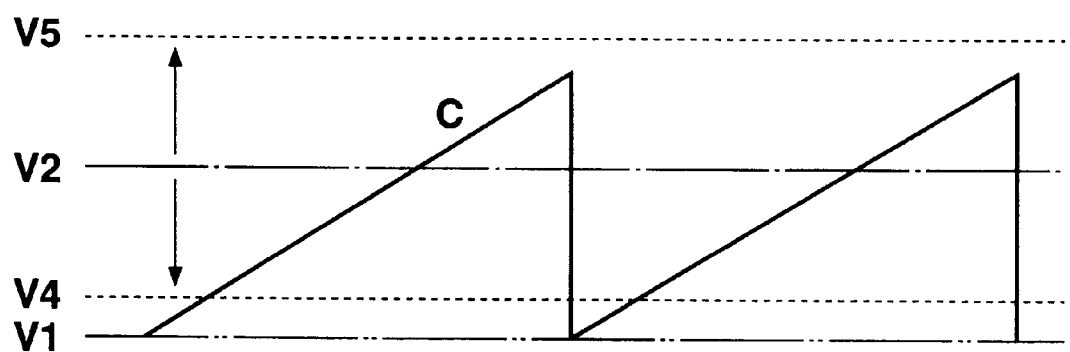
FIG. 8 is a diagram illustrating current waveforms at various points in a motor according to the present invention in ambient temperature changes.

FIG. 7 is a diagram illustrating the configuration of a motor drive circuit according to another preferred embodiment. FIG. 8 is a diagram illustrating current waveforms indicative of a relationship between a sawtooth waveform signal and a reference voltage. In this embodiment, the resistor 15 and the thermistor 16 are serially connected between the power supply VCC and ground. The voltage V2 (>V1) occurs from the intermediate connection point between the resistor 15 and the thermistor 16 in response to a change in the ambient temperature. The selection circuit 42 selectively outputs one of the voltages V2 and V4, which are both higher than the voltage V1. The thermistor 16 has a characteristic such that the resistance value is smaller for a higher ambient temperature. When the voltage V2 drops below the voltage V4 due to a change in the ambient temperature, the selection circuit 42 selects the voltage V4 for output. The first comparator 17 compares a sawtooth wave signal C and the voltages V2, V4, V5 (V4<V2<V5). In other words, as shown in FIG. 8, the first comparator 17 compares the sawtooth wave signal C with the voltage V2 when the voltage V2 is between the voltage V4 and the voltage V5, with the voltage V4 when the voltage V2 drops below the voltage V4, and with the voltage V5 when the voltage V2 exceeds the voltage V5. Then, the first comparator 17 produces a first comparison signal D (a first drive off signal) which is at a high level during a period where the voltages V2, V4, and V5 are higher than the sawtooth wave signal C, and at a low level during a period where the voltages V2, V4, and V5 are lower than the sawtooth wave signal C. The period where the first comparison signal D is at a high level is shorter with a higher ambient temperature of the thermistor 16, and longer with a lower ambient temperature. Note that as the voltage V2 seldom exceeds the voltage V5, comparison between the voltages V5 and V2 may be omitted.

Furthermore, a first capacitor 100 is connected between the base and the collector of the NPN transistor 6 while a second capacitor 101 is connected between the base and the collector of the NPN transistor 8. When a drive current flows through the first coil 1, the left terminal of the first capacitor 100 is positively charged and the right terminal of the first capacitor 100 is negatively charged. Hence, when the first drive signal I becomes a low level and the drive current IL1 does not flow, the potential of the right terminal of the first capacitor 100 rises while the potential of the left terminal of the first capacitor 100 rises by the same potential. In this operation, the NPN transistor 6 is gradually turned off while the drive current IL1 falls slantingly. This operation is applicable for the case of the drive current IL2. Thus, this modification can further reduce motor noise.

When the end point of the drive current IL1 exceeds the phase changeover point due to the capacitance of the capacitor 100 and the end point of the drive current IL2 exceeds the phase changeover point due to the capacitance of the capacitor 101 or when the end point of the drive currents IL1 and IL2 approaches the phase changeover point due to an increase in ambient temperature, the end point of the drive current IL1 and the starting point of the drive current IL2 overlap. Hence, it becomes difficult to null the drive currents IL1 and IL2 near to the phase changeover point. This produces reactive current, thus resulting in decreased motor drive efficiency.

According to the present invention, even when the ambient temperature increases, the reference voltage input to the first comparator 17 does not fall to or below the voltage. Thus, because the drive currents IL1 and IL2 are consistantly turned off near the phase changeover point of the motor drive current, any decrease in the efficiency of the motor drive can be prevented.

Figure 9:
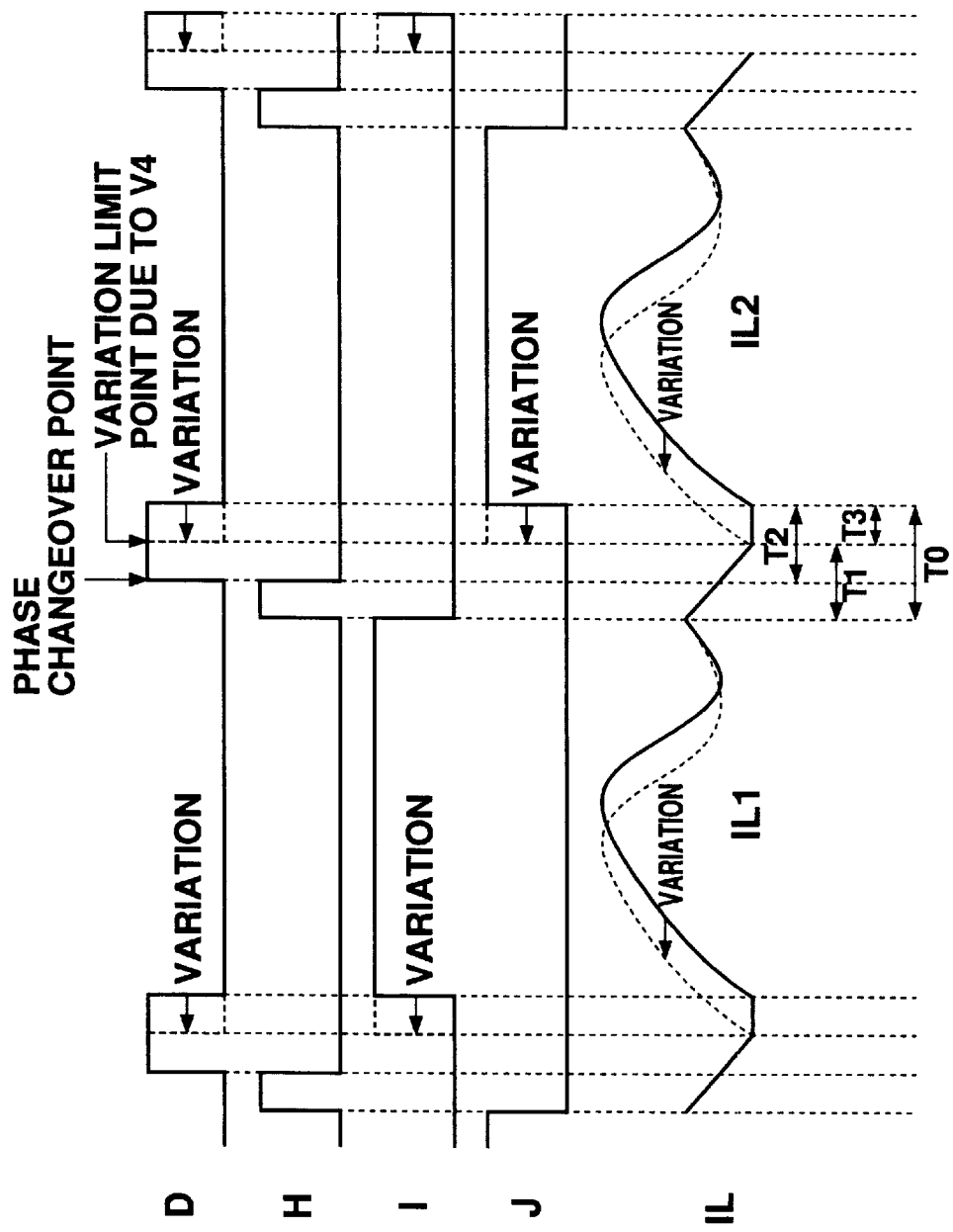
FIG. 9 is a diagram illustrating current waveforms at various points when ambient temperature is changed.

FIG. 9 is a diagram illustrating changes of the current drive IL1, IL2 with respect to the ambient temperature.

In the drawing, the period T0 is a period where the first and second drive transistors 7, 9 are both off at, for example, a normal temperature (25° C.). The period T1 is a time period required for the drive current IL to drop to zero due to the capacitance of the capacitor 100, 101, and, for the sake of convenience of the explanation, the trailing edge of the drive current IL is set past the phase changeover point of the first and second coils 1, 2. The period T2 is a time width during which the starting point of the drive current IL varies due to an increase of the ambient temperature. The period T3 is a time width during which the starting point of the drive current IL according to the present invention varies. According to the present invention, the end point and the starting point of the drive current IL1, IL2 can be set not overlap each other because of the variation limit based on the voltage V4.

Figure 10:
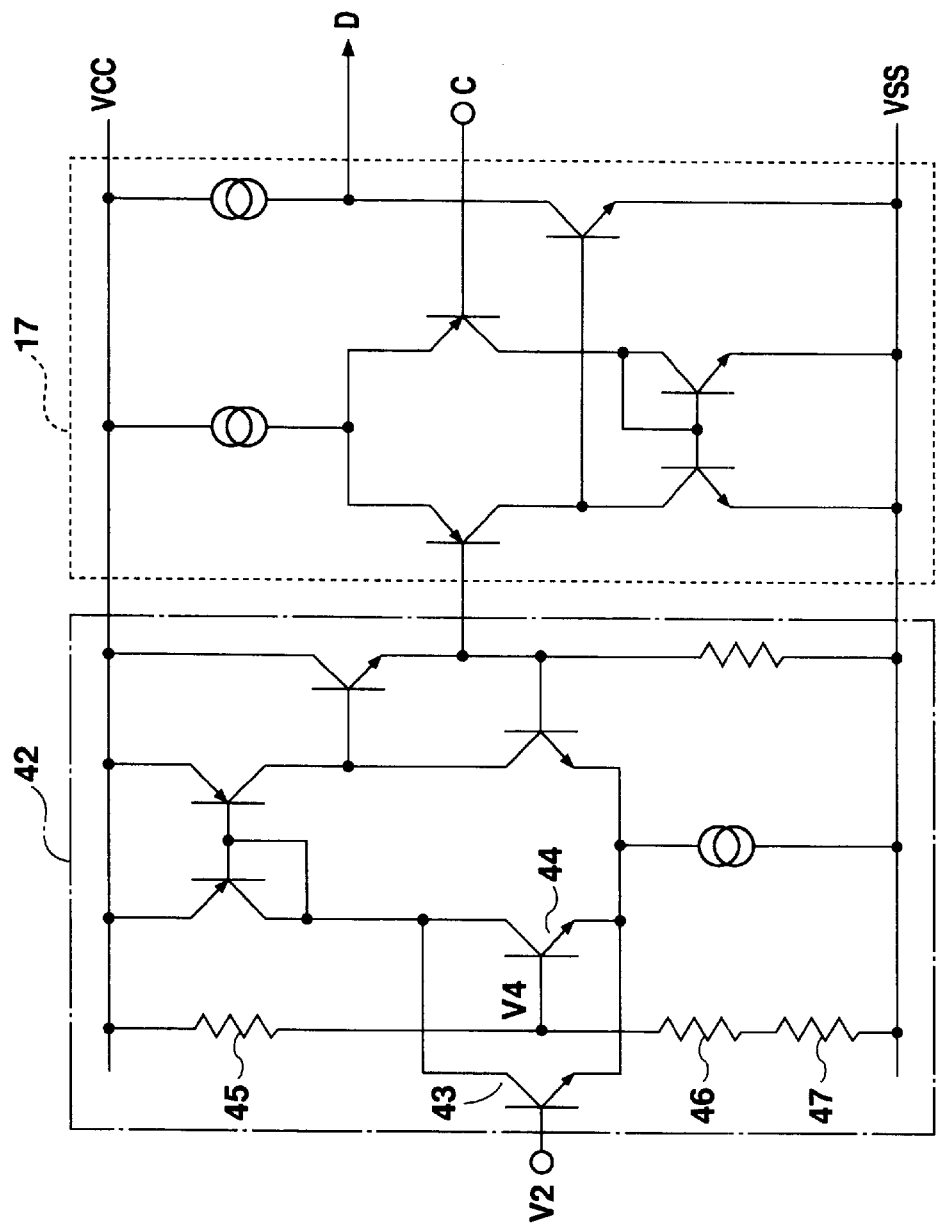
FIG. 10 is a diagram illustrating the configuration of a motor drive circuit according to further another modified embodiment.

FIG. 10 is a circuit diagram illustrating the comparator 17 and the selection circuit 42 according to an embodiment of the present invention. In normal temperatures, the voltage V2 is set to a value between the voltage V4 and the voltage V5 under the influence of the resistance value of the thermistor 16.

Referring to FIG. 10, NPN transistors 43 and 44 are differentially connected. The voltage V2 is applied to the base of the NPN transistor 43. The voltage V4 divided by the resistors 45, 46 and 47 is applied to the base of the NPN transistor 44. The composite resistance of the resistors 45 and 46 is equal to the resistance value of the resistor 28, 29, or 47. In other words, the voltage V4 is higher than the voltage V1. Hence, when the voltage V2 is higher than the voltage V4, the NPN transistor 43 is turned on, so that the reference voltage V2 is applied to one input of the comparator 17. Thus, the comparator 17 compares the sawtooth wave signal C with the reference voltage V2. When the voltage V2 becomes lower than the voltage V4 due to an increase in ambient temperature, the NPN transistor 44 is turned on, so that the voltage V4 is applied to one input of the comparator 17. The comparator 17 compares the sawtooth wave signal with the reference voltage V4. The reference voltage V4 is a value by which the first comparison signal D can be shortened by only the duration T3. This can prevent an overlap between the drive currents IL1 and IL2, that is, the occurrence of reactive current. Moreover, when an ambient temperature drops and the voltage V2 is higher than the voltage V5 obtained by dividing with the series resistors 48 and 49, the PNP transistor 50 is turned off while the PNP transistor 51 is turned on. The comparator 17 compares the sawtooth wave signal C with the reference voltage V5. In this operation, the reference voltage V2 is limited to a value between the minimum voltage V4 and the maximum voltage V5. Thus, a fan can be adapted to normally-rotated apparatuses according to ambient temperatures. The function of limiting the upper value and the lower value of the reference voltage shown in FIG. 9 can be integrated in one chip form.

What is claimed is:

1. A motor drive circuit for supplying a motor drive current to first and second coils of a motor, comprising:

first and second transistors for sequentially switching over the first and second coils to supply thereto drive currents which are complementarily to each other, based on a sine wave signal generated in accordance with a relative positional relationship between a stator and a rotor of a motor;

a first drive off signal generation circuit for generating a sawtooth wave signal based on the sine wave signal for comparison with a predetermined reference voltage to generate a first drive off signal based on a comparison result near a changeover point of the motor drive current;

a second drive off signal generation circuit for comparing a full wave signal and a sample hold signal to generate a second drive off signal near the changeover point of the motor drive current, the full wave signal being obtained through full wave conversion applied to the sine wave signal, the sample hold signal being obtained through sampling and holding an amplitude of an attenuated signal at a timing based on the first drive off signal, the attenuated signal being obtained by attenuating the full wave signal; and a third drive off signal generation circuit for adding the first drive off signal and the second drive off signal to generate a third drive off signal, wherein
the first and second transistors are simultaneously turned off in response to the third drive off signal.

2. A circuit according to claim 1, wherein:

said first drive off signal generation circuit includes
a sawtooth wave signal generation circuit generating a sawtooth wave signal by charging according to a predetermined time constant and discharging at a timing for switching over driving of the first and second coil, and
a first comparison circuit for comparing the sawtooth wave signal with a reference voltage higher than a minimum voltage of the sawtooth wave signal, and outputs a first drive off signal taking one logical level during a predetermined period from a point where the sawtooth wave signal generation circuit is discharged to a point where the sawtooth wave signal become higher than the reference voltage based on a comparison between the sawtooth wave signal and the reference voltage and said second drive off signal generation circuit includes
a sample hold circuit for carrying out sampling and holding operation with respect to the attenuated signal at an end of the one logical level of the first drive off signal to hold an amplitude of the attenuated signal at that time, and nulling the amplitude held at a later starting point of the one logical level of the first drive off signal to thereby output a trapezoidal wave signal, the attenuated signal being obtained by attenuating the full wave signal and
a second comparison circuit for comparing the full wave signal and the trapezoidal wave signal, and outputs a second drive off signal taking one logical level during a period from a point where the trapezoidal wave becomes higher than the full wave signal to a point where the sawtooth wave signal generation circuit is discharged.

3. A circuit according to claim 2, further comprising:

a control pulse generation circuit for generating a control pulse based on the sine wave signal at a timing at which driving of the first and second coils is switched over, wherein
said sawtooth wave signal generation circuit discharges at a timing where the control pulse is generated, to thereby generate the sawtooth wave signal.

4. A circuit according to claim 1, wherein:

the reference voltage supplied to said first comparison circuit varies in response to a temperature change.

5. A circuit according to claim 4, wherein:

the reference voltage is supplied via an external terminal from outside.

6. A circuit according to claim 1, further comprising:

a slanting circuit for slanting a trailing end of the drive current flowing through the first and second coils.

7. A circuit according to claim 6, wherein:

said slanting circuit includes capacitors arranged between base and collector of the first and second transistors.

8. A circuit according to claim 6, wherein:

the reference voltage supplied to said first comparison circuit varies in response to a temperature change.

9. A circuit according to claim 8, wherein:

variation of the reference voltage in response to a temperature change is limited such that the variation remains equal to or above a predetermined lower limit value.

10. A circuit according to claim 8, wherein:

variation of the reference voltage in response to a temperature change is limited such that the variation remains between predetermined upper and lower limit values.

11. A motor drive circuit for supplying a motor drive current to first and second coils of a motor, comprising:

first and second transistors for supplying drive currents complementarily to each other, respectively, to the first and second coils, based on a sine wave signal generated in accordance with relative positional relationship between a stator and a rotor of a motor;

a first drive off signal generation circuit for generating a first drive off signal which remains at a first level only during a predetermined period before a changeover point of the drive current to be supplied to the first and second coils;

a second drive off signal generation circuit for generating a second drive off signal which remains at the first level only during a predetermined period after the changeover point of the drive current to be supplied to the first and second coils; and an addition circuit for adding the first drive off signal and the second drive off signal, wherein the first and second transistors are simultaneously turned off in response to an output from said addition circuit near the changeover point of the drive current to be supplied to the first and second coils.

* * * * *